(12) United States Patent
Carbone

(10) Patent No.: US 8,740,493 B2
(45) Date of Patent: Jun. 3, 2014

(54) TORQUE TUBE WITH ASSEMBLY ASSURANCE FEATURE

(71) Applicant: Hamilton Sundstrand Corporation, Windsor Locks, CT (US)

(72) Inventor: Michael Carbone, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/630,074

(22) Filed: Sep. 28, 2012

(65) Prior Publication Data

US 2014/0093313 A1    Apr. 3, 2014

(51) Int. Cl.
*F16D 1/02* (2006.01)

(52) U.S. Cl.
USPC .................................... 403/359.1; 403/362

(58) Field of Classification Search
USPC ............... 464/182; 403/359.1, 359.5, 362; 180/380; 74/607; 244/99.2
See application file for complete search history.

(56) References Cited

U.S. PATENT DOCUMENTS

| | | | |
|---|---|---|---|
| 1,397,304 A * | 11/1921 | D'Orsay | 180/380 X |
| 4,696,376 A | 9/1987 | Reynolds | |
| 5,323,881 A | 6/1994 | Machan et al. | |
| 5,782,436 A | 7/1998 | Pohling | |
| 7,208,854 B1 | 4/2007 | Saban | |
| 7,216,600 B1 | 5/2007 | Hamilton et al. | |
| 7,322,545 B2 * | 1/2008 | Sheahan et al. | 244/99.2 X |
| 7,462,961 B2 | 12/2008 | Kwon et al. | |
| 7,527,559 B2 | 5/2009 | Ikeda | |
| 7,909,146 B2 | 3/2011 | Dyko et al. | |
| 8,133,027 B2 | 3/2012 | Carvalho et al. | |
| 8,267,656 B2 | 9/2012 | Carvalho et al. | |

* cited by examiner

*Primary Examiner* — Gregory Binda
(74) *Attorney, Agent, or Firm* — Carlson, Gaskey & Olds, PC

(57) ABSTRACT

A connection for transmitting rotating torque has a first component having a shaft with male spline teeth on an outer peripheral surface of the shaft. The male spline teeth extend to an inner end, and there is a blocking portion of the shaft extending in an inner direction from the inner end of the male spline teeth. A second component has a hollow portion with female spline teeth on an inner periphery of a bore. The female spline teeth extend to an outer end. Bolt holes are formed in both the hollow portion and the shaft. The bolt hole in the shaft is formed in a portion of the shaft receiving the male spline teeth. A bolt extends through the bolt holes, and the shaft is secured within the hollow portion. A distance from an inner end of the blocking portion to the inner end of the male spline teeth is greater than a distance between an outer surface on the bolt to the outer end of the female spline teeth on the hollow portion.

6 Claims, 2 Drawing Sheets

TORQUE TUBE WITH ASSEMBLY ASSURANCE FEATURE

BACKGROUND OF THE INVENTION

This application relates to a rotating connection between two components, wherein a feature is included that will assist in assuring a proper assembly.

Torque tubes are known and utilized to in aircraft actuation systems to transmit rotational motion from one system component, to another system component. Components may be the power drive unit, actuators, bearing supports, sensors, brakes, or other components. Actuation systems may be employed to actuate slat and flap panels on fixed wing aircraft for high lift, flight control surfaces, aircraft doors, landing gears, and etc. This application may apply to any system which requires torque tubes to transmit motion to/from adjacent components.

It is known to use a spline connection formed between the torque tube and the component. This spline connection may have a spline on the torque tube termination and a mating spline on a surface of the component. Typically, a bolt hole is formed through both the torque tube termination and the component, and in an area having spline teeth. The component and the torque tube are assembled together with their spline teeth engaged and the bolt is passed through the bolt holes to secure the connection axially.

Such connections may be utilized in any number of applications, such as an aircraft actuation system which consists of drive unit, flap actuators, slat actuators, bearing supports, sensors, brakes, or other components, all of which must be attached in synchronous motion.

The tube termination possesses a female spline which will receive the male splined incorporated into the shaft of the adjacent component. In other cases, the male spline may be placed on the torque tube termination and the female spline placed on the adjacent component.

In the prior art, when the component and the torque tube have been incorrectly assembled, it has been the case that the bolt has not been inserted through the bolt hole in the inner member. Still, the spline teeth may be positioned such that there is some engagement. In such a case, rotational motion may be transmitted, even though the two are not properly secured from sliding out of engagement.

SUMMARY OF THE INVENTION

A connection for transmitting rotating torque has a first component having a shaft with male spline teeth on an outer peripheral surface of the shaft. The male spline teeth extend to an inner end, and there is a blocking portion of the shaft extending in an inner direction from the inner end of the male spline teeth. A second component has a hollow portion with female spline teeth on an inner periphery of a bore. The female spline teeth extend to an outer end. Bolt holes are formed in both the hollow portion and the shaft. The bolt hole in the shaft is formed in a portion of the shaft receiving the male spline teeth. A bolt extends through the bolt holes, and the shaft is secured within the hollow portion. A distance from an inner end of the blocking portion to the inner end of the male spline teeth is greater than a distance between an outer surface on the bolt to the outer end of the female spline teeth on the hollow portion.

These and other features of this application will be best understood from the following specification and drawings, the following of which is a brief description.

DETAILED DESCRIPTION

Figure 1:
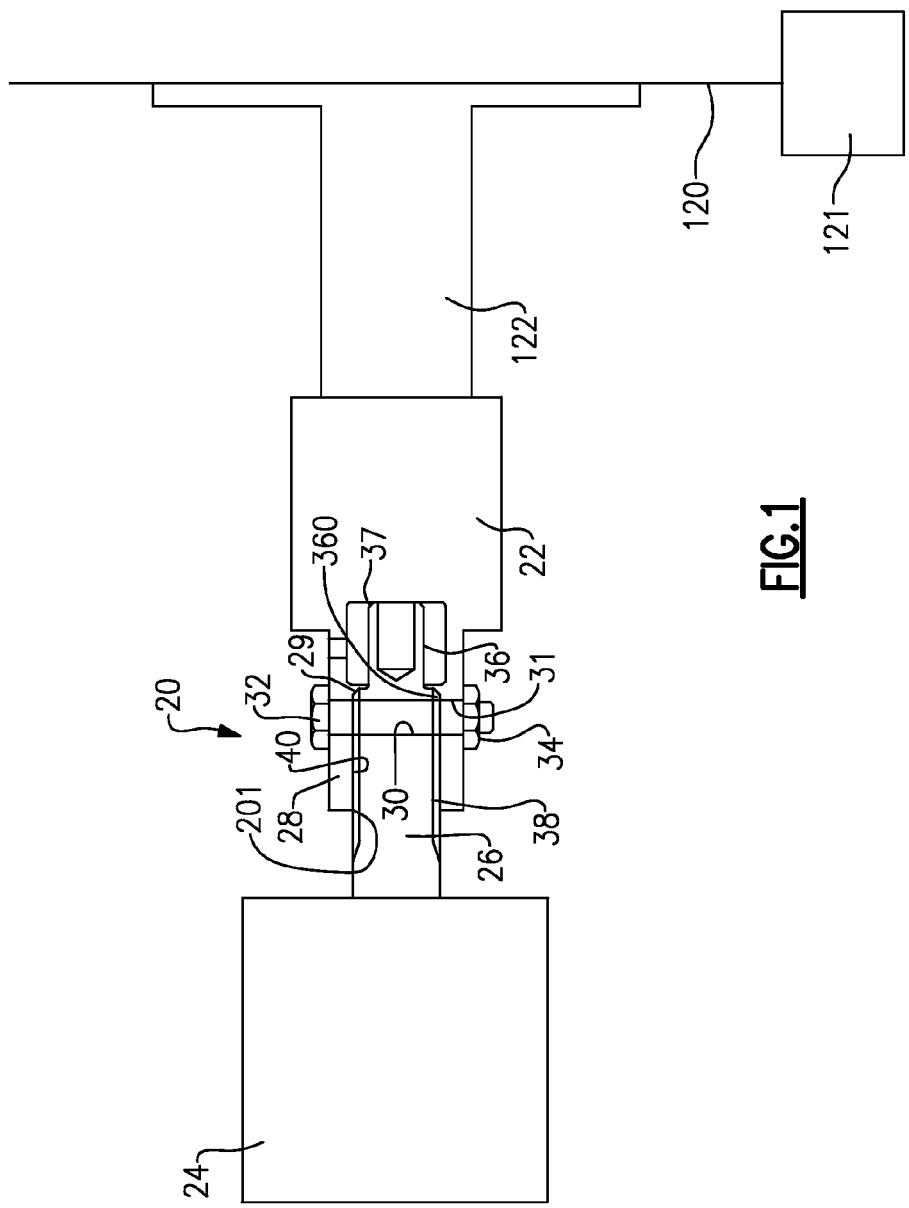
FIG. 1 shows a properly assembled drive connection.

A drive actuation system 20 is illustrated in FIG. 1. An actuator 24 or other source of drive input drives a shaft 26. Shaft 26 is received within a hollow portion 28 of a connection member 22. Connection member 22 is part of a torque tube 122, which in turn extends to an actuator 120 that drives an output 121. Output 121 may be a flap or slat panel and may be mounted on an aircraft. Of course, other drive outputs may come within the scope of this invention. For purposes of this application, the actuator 24 and the connection member 22 are collectively known as "components" which transmit rotation. Of course, the "components" which may benefit from this application would extend to any number of other components which must be connected together to transmit rotation.

Male spline teeth 38 are formed on the outer diameter of the shaft 26 to an inner end 29. The direction "inner" should be interpreted as extending inwardly into hollow portion 28 or to the right in the Figures. Female spline teeth 40 are formed in a bore in the hollow portion 28, and extend from outer end 201 to inner end 360. A bolt 32 extends through bolt hole 31 in the hollow portion 28 and bolt hole 30 in the shaft 26. A nut 34 secures the bolt 32 within the shaft 26 and hollow portion 28, after having extended through the holes 30 and 31. A radially smaller portion 36 is inward of the shaft 26 and extends to an inner end 37. Portion 36 is not provided with spline teeth.

As shown, with the bolt properly received in the bolt holes 30 and 31, torque can be transmitted through the spline teeth 38/40 and the connection is secured from sliding out of engagement.

Figure 2:
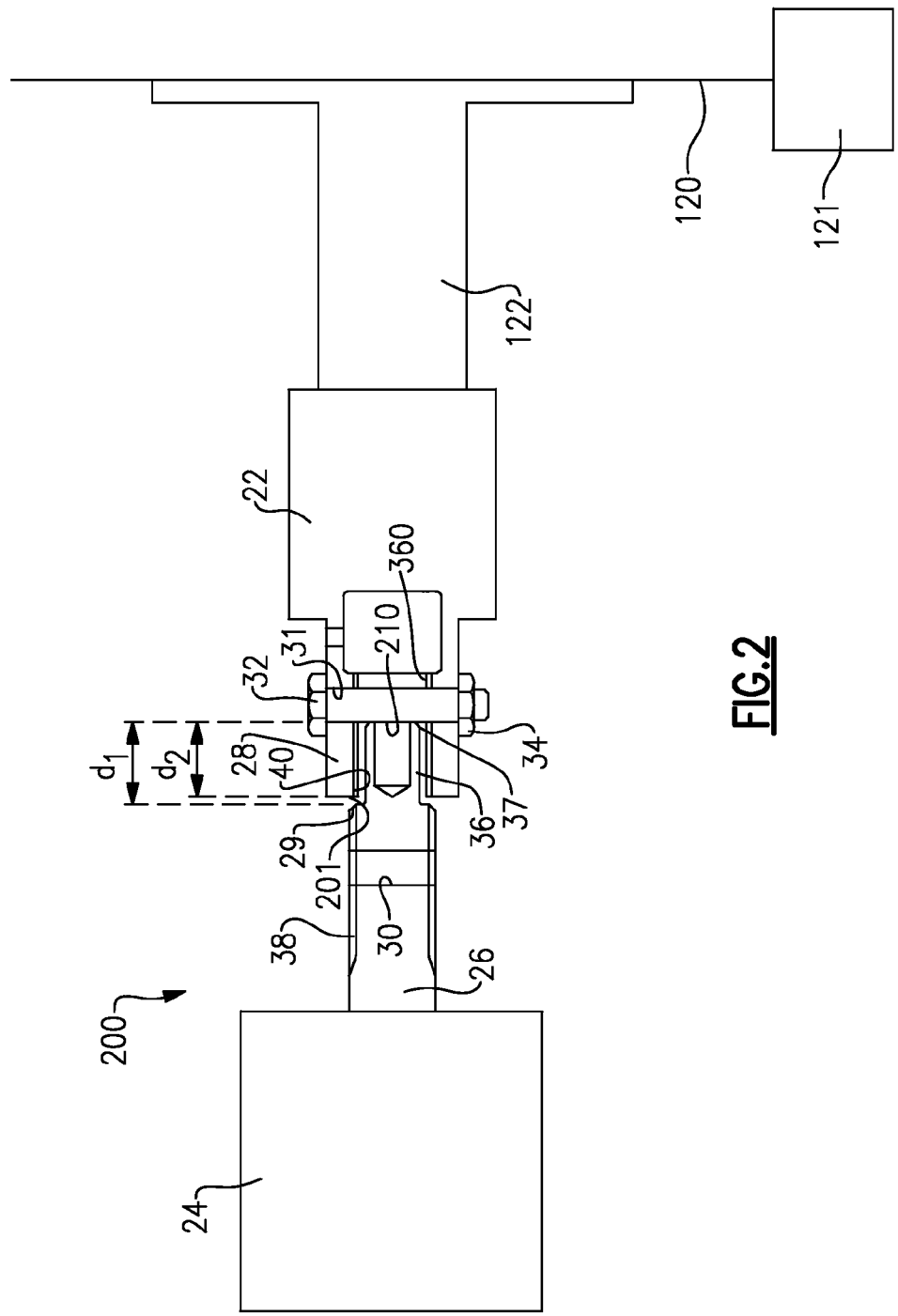
FIG. 2 shows an improperly assembled FIG. 1 connection.

However, the two components may not always properly connected. FIG. 2 shows an improperly assembled connection 200. Here, the inner end 37 of the smaller portion 36 actually abuts an outer surface 210 on the bolt 32. This could occur if the bolt 32 has been inadvertently installed through the bolt hole 31, but not the bolt hole 30. In this manner, portion 36 could be thought of as a blocking portion.

In this position, one can see the female spline teeth 40 do not engage the male spline teeth 38.

This is true, since a distance d1 is defined between inner end 37 of the smaller portion, and the inner end 29 of the spline teeth 38. Distance d1 is greater than a distance d2 between the outer surface 210 of the bolt 32 and the outer end 201 of the spline teeth 40. Thus, the provision of the smaller portion 36 ensures there will be no engagement between the spline teeth 38 and 40 unless the two components 24 and 22 are properly connected.

While the shaft 26 is shown on the actuator 24, the "inner member" could be associated with the connection member 22, and the hollow portion could be associated with the actuator 24.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A connection for transmitting rotation comprising:
a first component having a shaft with male spline teeth on an outer peripheral surface of said shaft, said male spline teeth extending to an inner end of said male spline teeth, and a blocking portion of said shaft extending in an inner direction from said inner end of said male spline teeth;

a second component has a hollow portion with female spline teeth on an inner periphery of a bore in said hollow portion, with said female spline teeth extending to an outer end, the directions inner and outer being defined extending into the bore;

bolt holes formed in both said hollow portion and said shaft, said bolt hole in said shaft formed in a portion of said shaft receiving said male spline teeth;

a bolt extending through said bolt holes, and securing said shaft within said hollow portion;

wherein a distance from an inner end of said blocking portion to said inner end of said male spline teeth on said shaft is greater than a distance between an outer surface on said bolt to said outer end of said female spline teeth on said hollow portion; and said distances being such that said male spline teeth will not engage said female spline teeth at all, contrary to said bolt if a bolt extends through said bolt hole in said hollow portion, but not said bolt hole in said shaft.

2. The connection as set forth in claim 1, wherein a difference in the two distances ensures that said male spline teeth cannot be engaged at all within said female splined teeth, unless said bolt also extends through said bolt hole in said shaft.

3. The connection as set forth in claim 1, wherein said first component is an actuator for driving said second component.

4. The connection as set forth in claim 3, wherein said second component is part of a torque tube.

5. The connection as set forth in claim 4, wherein said torque tube driving an actuator for actuating one of a flap or slat to be utilized in an aircraft.

6. A connection for transmitting rotation comprising:

an actuator having a shaft with male spline teeth on an outer peripheral surface of said shaft, said male spline teeth extending to an inner end of said male spline teeth, and there being a blocking portion of said shaft extending in an inner direction from said inner end of said male spline teeth;

a torque tube connection having a hollow portion with female spline teeth on an inner periphery of a bore in said hollow portion, with said female spline teeth extending to an outer end, the directions inner and outer being defined extending into the bore;

bolt holes formed in both said hollow portion and said shaft, said bolt hole in said shaft formed in a portion of said shaft receiving said male spline teeth;

a bolt extending through said bolt holes, and a nut securing said shaft within said hollow portion;

said torque tube driving an actuator for actuating a system to be utilized in an aircraft;

wherein a distance from an inner end of said blocking portion to said inner end of said male spline teeth on said shaft is greater than a distance between an outer surface on said bolt to said outer end of said female spline teeth on said hollow portion; and a difference in the two distances ensures that said shaft cannot be received within said hollow portion with said male spline teeth on said shaft engaged with said female spline teeth on said hollow portion, unless said bolt also extends through said bolt hole in said shaft.

* * * * *